US011238339B2

(12) United States Patent
Powell et al.

(10) Patent No.: US 11,238,339 B2
(45) Date of Patent: Feb. 1, 2022

(54) PREDICTIVE NEURAL NETWORK WITH SENTIMENT DATA

(71) Applicant: International Business Machines Corporation, Armonk, NY (US)

(72) Inventors: Jeff Powell, Marietta, GA (US); Aaron K. Baughman, Silver Spring, MD (US); John J. Kent, North Attleboro, MA (US); John C. Newell, Austin, TX (US); David Provan, Cobb, GA (US); Noah Syken, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 15/667,287

(22) Filed: Aug. 2, 2017

(65) Prior Publication Data

US 2019/0042933 A1  Feb. 7, 2019

(51) Int. Cl.
*G06N 3/08* (2006.01)
*G06N 3/04* (2006.01)
*G06N 20/00* (2019.01)
*G06F 16/20* (2019.01)
*G06F 16/30* (2019.01)
*G06F 40/30* (2020.01)

(52) U.S. Cl.
CPC ............... *G06N 3/08* (2013.01); *G06F 16/20* (2019.01); *G06F 16/30* (2019.01); *G06F 40/30* (2020.01); *G06N 20/00* (2019.01); *G06N 3/0454* (2013.01); *G06N 3/082* (2013.01)

(58) Field of Classification Search
CPC ......... G06N 3/0454; G06N 3/08; G06N 20/00
See application file for complete search history.

(56) References Cited

U.S. PATENT DOCUMENTS

| 8,346,702 | B2 | 1/2013 | Busch et al. | |
| 8,447,420 | B2 | 5/2013 | Bloodworth | |
| 2003/0204368 | A1* | 10/2003 | Ertin | G06K 9/6262 |
| | | | | 702/179 |

(Continued)

OTHER PUBLICATIONS

Schumaker et al., "Sports Data Mining", 2010, 176 pages, https://ai.arizona.edu/sites/ai/files/MIS510/sportsdatamining_book.pdf.

(Continued)

*Primary Examiner* — Omar F Fernandez Rivas
*Assistant Examiner* — Selene A. Haedi
(74) *Attorney, Agent, or Firm* — Peter J. Edwards

(57) ABSTRACT

A set of vectors may be obtained. The vectors may be multi-dimensional vectors that are associated with and describe tokens from a first set of tokens from a corpus of sources. The description may be based in part on the relationship of the token to at least a portion of the remainder of the corpus. A set of sentiment scores may be obtained. The sentiment scores in the set of sentiment scores may describe a sentiment associated with a corresponding token that is described by a vector from the set of vectors. The set of vectors and the set of sentiment scores may be input into a pattern-recognizer pathway in a first neural network. A probability value of a potential future event may then be generated by the first neural network. The probability value may be based on the set of vectors and the set of sentiment scores.

11 Claims, 8 Drawing Sheets

(56) References Cited

U.S. PATENT DOCUMENTS

| | | | |
|---|---|---|---|
| 2012/0084251 A1* | 4/2012 | Lingenfelder | G06F 17/18 707/600 |
| 2013/0246322 A1* | 9/2013 | De Sousa Webber | G06F 40/30 706/18 |
| 2014/0095425 A1* | 4/2014 | Sipple | G06N 7/005 706/52 |
| 2014/0337257 A1* | 11/2014 | Chatterjee | G06N 20/00 706/12 |
| 2015/0293976 A1* | 10/2015 | Guo | G06N 3/0454 707/706 |
| 2016/0140231 A1* | 5/2016 | Agarwal | G06F 16/334 707/749 |
| 2016/0379112 A1* | 12/2016 | He | G06N 3/0454 706/25 |
| 2017/0124447 A1* | 5/2017 | Chang | G06F 16/3334 |
| 2017/0308985 A1* | 10/2017 | Grom | G06Q 10/06375 |
| 2018/0052928 A1* | 2/2018 | Liu | G06F 16/2228 |
| 2018/0225591 A1* | 8/2018 | Chandramouli | G06N 20/00 |

OTHER PUBLICATIONS

Huey, "Using Data Science to Win in Fantasy Football", Jun. 21, 2016, 8 pages.
Chen, "Fantasy Football Tiers", printed Jun. 26, 2017, 2 pages.
Rathburn, "DFS Football 101: A Winner's Guide to NFL DFS", Sep. 8, 2015, 4 pages.
Unknown, "Daily Fantasy Sports Rankings", printed Jun. 26, 2017, 7 pages.
Unknown, "NFL, NBA, and MLB Lineup Optimizer for FanDuel and DraftKings", Lineup Lab, printed Jun. 26, 2017, 6 pages.
Heitner, "What Verizon Purchase Of Yahoo Means For NFL Content And Fantasy Sports", Jul. 25, 2016, 9 pages.
Unknown, "Projections for 2017 season", last updated Jul. 30, 2017, 1 page, http://apps.fantasyfootballanalytics.net/lineupoptimizer/.
Mell et al., "The NIST Definition of Cloud Computing", Recommendations of the National Institute of Standards and Technology, Special Publication 800-145, Sep. 2011, 7 pages.
Brostoff et al., "BenBrostoff / draft-kings-fun", https://github.com/BenBrostoff/draft-kings-fun, last updated Mar. 18, 217, pp. 1-3.

* cited by examiner

PREDICTIVE NEURAL NETWORK WITH SENTIMENT DATA

BACKGROUND

Aspects of the present disclosure relate to predictive neural networks, more particular aspects relate to specialized neural networks used to generate projections based on structured and unstructured data, including sentiment data.

Typical solutions for predictive neural networks utilize structured and unstructured data to make predictions associated with the data. The accuracy of prediction systems may be limited by the inability to account for multiple types of data, including sentiment data associated with terms in the unstructured data.

SUMMARY

Some embodiments of the present disclosure can be illustrated by a method comprising obtaining a first set of vectors. Each vector in the first set of vectors may be a multi-dimensional vector that is associated with and describes a token from a first set of tokens from a corpus of sources. The description may be based in part on a relationship of the token to at least a portion of the remainder of the corpus. The corpus may contain at least one natural-language source. The method may also comprise obtaining a first set of sentiment scores. Each sentiment score in the first set of sentiment scores may describe a sentiment associated with a corresponding token. Each corresponding token may be described by a vector in the first set of vectors. The method may also comprise inputting the first set of vectors and the first set of sentiment scores into a first pattern-recognizer pathway in a first neural network. Finally, the method may also comprise generating, by the first neural network and based on the first set of entity vectors and the first set of sentiment scores, a first probability value of a first potential future event.

Some embodiments of the present disclosure can also be illustrated by a computer program product comprising a computer readable storage medium having program instructions embodied therewith, the program instructions executable by a computer to cause the computer to obtain a first set of entity vectors. Each entity vector in the first set of entity vectors may be a multi-dimensional entity vector that is associated with and describes an entity from a first set of entities from a corpus of sources. The description may be based in part on a on a relationship of the entity to at least a portion of the remainder of the corpus. The corpus of sources may contain at least one natural language source. The computer may obtain a first set of sentiment scores. Each sentiment score in the first set of sentiment scores may determine a sentiment associated with a corresponding entity that is described by an entity vector in the first set of entity vectors. The computer may also input the first set of entity vectors and the first set of sentiment scores into a first pattern-recognizer pathway in a first neural network. Finally, the computer may generate, by the first neural network and based on the first set of entity vectors and the first set of sentiment scores, a first probability value of a first potential future event.

Some embodiments of the present disclosure can also be illustrated by a system comprising a processor and a memory in communication with the processor, the memory containing program instructions that, when executed by the processor, are configured to cause the processor to analyze, by the first neural network, a corpus of sources related to an identified subject matter, the corpus comprising at least one natural-language source. The processor may create, based on the analyzing the corpus, an entity model in the first neural network. The processor may also analyze a second corpus of sources related to the potential future event. The second corpus may comprise at least a second natural language source. The analyzing may comprise identifying, by the entity model, a list of entities related to the potential future event, identifying, by a concept mapper, a list of concepts related to the potential future event, and determining, by a sentiment classifier, a sentiment score for each entity in the list of entities.

The processor may input the list of entities, the list of concepts, and the second corpus into a second neural network. The processor may create, by the second neural network, an entity vector for the entity in the list of entities. The entity vector may be a multi-dimensional vector that defines the entity based in part on the relationship of the entity to at least a portion of the remainder of the second corpus. The processor may create, by the second neural network, a concept vector for the concept in the list of concepts. The concept vector may be a multi-dimensional vector that defines the concept based in part on the relationship of the concept to at least a portion of the remainder of the second corpus.

The processor may create, by the second neural network, a keyword vector for a keyword in the second corpus. The keyword vector may be a multi-dimensional vector that defines the keyword based in part on the relationship of the keyword to at least a portion of the remainder of the second corpus. The processor may input the entity vector and the sentiment score for the entity into a first pattern-recognizer pathway in a third neural network. The processor may input the concept vector into a second pattern-recognizer pathway in the third neural network. The processor may also input the keyword vector into a third pattern-recognizer pathway in the third neural network. Finally, the processor may generate, by the third neural network and based on the entity vector, the concept vector, the keyword vector, and the sentiment score, a probability value of the potential future event that is associated with the identified subject matter.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
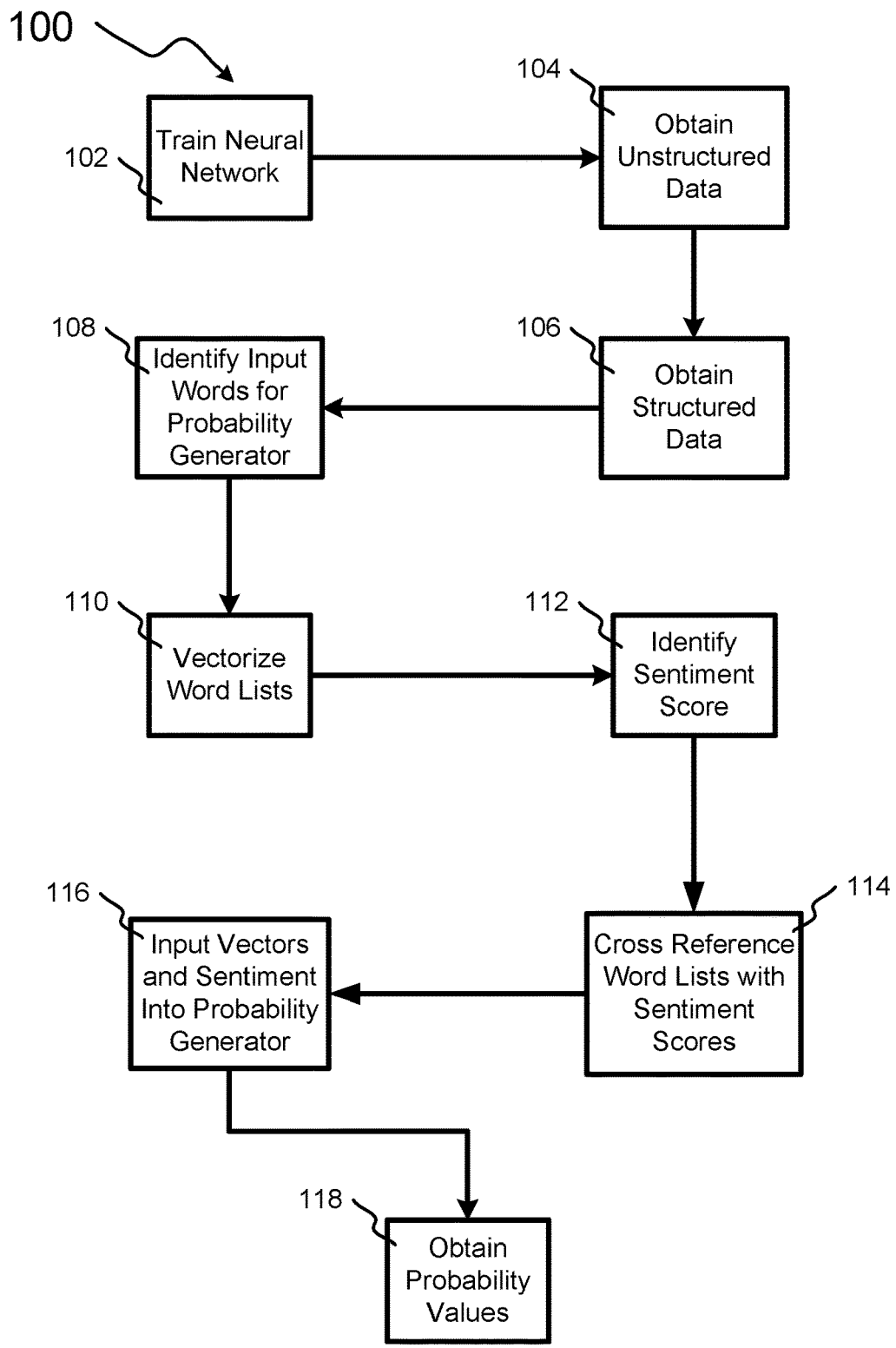
FIG. 1 illustrates an example method 100 of obtaining a predicted probability of a target event utilizing a predictive neural network, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to predictive neural networks, more particular aspects relate to specialized neural networks used to generate projections based on structured and unstructured data, including sentiment data. While the present disclosure is not necessarily limited to such applications, various aspects of the disclosure may be appreciated through a discussion of various examples using this context.

Neural networks may be trained to recognize patterns in input data by a repeated process of propagating training data through the network, identifying output errors, and altering the network to address the output error. Training data that has been reviewed by human annotators is typically used to train neural networks. Training data is propagated through the neural network, which recognizes patterns in the training data. Those patterns may be compared to patterns identified in the training data by the human annotators in order to assess the accuracy of the neural network. Mismatches between the patterns identified by a neural network and the patterns identified by human annotators may trigger a review of the neural network architecture to determine the particular neurons in the network that contributed to the mismatch. Those particular neurons may then be updated (e.g., by updating the weights applied to the function at those neurons) in an attempt to reduce the particular neurons' contributions to the mismatch. This process is repeated until the number of neurons contributing to the pattern mismatch is slowly reduced, and eventually the output of the neural network changes as a result. If that new output matches the expected output based on the review by the human annotators, the neural network is said to have been trained on that data.

Once a neural network has been sufficiently trained on training data sets for a particular subject matter, it may be used to detect patterns in analogous sets of live data (i.e., non-training data that have not been previously reviewed by human annotators, but that are related to the same subject matter as the training data). The neural network's pattern recognition capabilities can then be used for a variety of applications. For example, a neural network that is trained on a particular subject matter may be configured to review live data for that subject matter and predict the probability that a potential future event associated with that subject matter will occur.

However, accurate event prediction for some subject matters relies on processing live data sets that contain large amounts of data that are not structured in a way that allows computers to quickly process the data and derive a target prediction (i.e., a prediction for which a probability is sought) based on the data. This "unstructured data" may include, for example, various natural-language sources that discuss or somehow relate to the target prediction (such as blog posts, news articles, and social-media posts and messages), uncategorized statistics that may relate to the target prediction, and other predictions that relate to the same subject matter as the target prediction. Further, achieving accurate predictions for some subject matters is difficult due to the amount of sentiment context present in unstructured data that may be relevant to a prediction. For example, the relevance of many social-media and blog posts to a prediction may be based almost solely on the sentiment context expressed in the post. Unfortunately, computer-based event prediction systems such as neural networks are not currently capable of utilizing this sentiment context in target predictions due, in part, to a difficulty in differentiating sentiment-context data that is likely to be relevant to a target prediction from sentiment-context data that is likely to be irrelevant to a target prediction. Without the ability to identify relevant sentiment-context data, the incorporation of sentiment analysis into neural-network prediction analysis may lead to severe inaccuracies. Training neural networks to overcome these inaccuracies may be impractical, or impossible, in most instances.

The amount of unstructured data that may be necessary for accurate prediction analysis may be so large for many subject matters that human reviewers are incapable of analyzing a significant percentage of the data in a reasonable amount of time. Further, in many subject matters, large amounts of unstructured data is made available frequently (e.g., daily), and thus unstructured data may lose relevance quickly. For this reason, human reviewers are not an effective means by which relevant sentiment-context data may be identified for the purposes of prediction analysis. Therefore, an event-prediction solution that is capable of analyzing large amounts of structured data, selecting the sentiment context therein that is relevant to a target prediction, and incorporating that sentiment context into a prediction is required.

Some embodiments of the present disclosure may improve upon neural-network predictive modeling by incorporating multiple specialized neural networks into a larger neural network that, in aggregate, is capable of analyzing large amounts of structured data, unstructured data, and sentiment context. In some embodiments one component neural network may be trained to analyze sentiment of unstructured data that is related to the target prediction, whereas another component neural network may be designed to identify lists of words that may relate to the target prediction. As used herein, the terms "word" and "words" in connection with, for example, a "word type," a "word list," a "word vector," an "identified word" or others may refer to a singular word (e.g., "Minneapolis") or a phrase (e.g., "the most populous city in Minnesota"). For this reason, a "word" as used herein in connection with the examples of the previous paragraph may be interpreted as a "token." In some embodiments, this list of relevant words (e.g., entities) may be cross-referenced with sentiment-context data that is also derived from the unstructured data in order to identify the sentiment-context data that is relevant to the target prediction. In some embodiments, the multiple neural networks may operate simultaneously, whereas in other embodiments the output of one or more neural networks may be received as inputs to another neural network, and therefore some neural networks may operate as precursors to another. In some embodiments, multiple target predictions may be determined by the overall neural network and combined with structured data in order to predict the likelihood of a value at a range of confidence levels. In some embodiments these neural networks may be any type of neural network. For example, "neural network" may refer to a classifier-type neural network, which may predict the outcome of a variable that has two or more classes (e.g., pass/fail, positive/negative/neutral, or complementary probabilities (e.g., 60% pass, 40% fail)). "Neural network" may also refer to a regression-type neural network, which may have a single output in the form, for example, of a numerical value.

In some embodiments, for example, a neural network in accordance with the present disclosure may be configured to generate a prediction of the probability of a target event (i.e., the event for which a probability is sought in a target prediction) related to a particular subject matter. This configuration may comprise organizing the component neural networks to feed into one another and training the component neural networks to process data related to the subject matter. In embodiments in which the output of one neural network may be used as the input to a second neural network, the transfer of data from the output of one neural network to the input of another may occur automatically, without user intervention.

For example, in some embodiments a predictive neural network may be utilized to predict the numerical probability that a particular publicly traded company may realize a profit in a given fiscal quarter. The predictive neural network may be composed of multiple component neural networks that are complementarily specialized. For example, a first component neural network may be specialized in analyzing unstructured data related to the company (e.g., newspaper articles, blog posts, and financial-analyst editorials) to identify a list of entities in the unstructured data and identify sentiment data for each of those entities. One such entity, for example, may be the name of the particular company, whereas another such entity may be the name of the particular company's CEO.

However, the list of entities and corresponding sentiment data may also contain irrelevant entities (and thus sentiment data). For example, one blog post may reference the blog author's business-school teacher. Therefore, a second component neural network may be specialized to review structured and unstructured data and identify a list of relevant entities within the unstructured data. This list of entities may then be cross-referenced with the entities identified by the first component neural network. The sentiment data of the entities identified as relevant by the second component neural network may then be selected.

In this example, the list of entities identified by the second component neural network may be vectorized by a third component neural network. As a result, each entity from the list of entities may be represented by a corresponding word vector, and each feature vector may be associated with corresponding sentiment data. These word vectors and associated sentiment data may be input into a fourth component neural network. This fourth component neural network may be specialized to process the word vectors and sentiment data and output a numerical probability that the particular company will realize a profit in the given fiscal quarter.

FIG. 1 illustrates an example method 100 of obtaining a predicted probability of a target event utilizing a predictive neural network that comprises several specialized neural-network components. At block 102, the neural network is trained. In some embodiments the nature of this training may vary based on, for example, the specialization of the component neural networks being trained, the input processed by those neural networks, or the output generated by those neural networks.

For example, a first neural network may be configured to ingest a corpus of data sources related to the subject matter and output a list of "word types" related to the target prediction. These word types may be, for example, entities (e.g., a thing that has its own independent existence; something that exists apart from other things). In an ontological structure, entities may form the "ground level" of the structure (e.g., the terminus from which no branches depend). Entities may be named entities (e.g., John Doe) or standard entities (person). This first neural network would therefore be trained to understand the vocabulary of the particular subject matter, so it could identify, in the corpus of data sources, a list of entities that are relevant to the target prediction. A second neural network, for example, may be trained to identify sentiment context associated with the identified entities in the corpus (e.g., were the entities spoken of in a positive, negative, or neutral manner?). A third neural network may accept the list of entities and convert the entities into vectors, which may, together with the sentiment data, feed into a fourth neural network. This fourth neural network may process the entity vectors and the sentiment data and calculate a probability of the target event occurring. This fourth neural network may therefore be trained in recognizing patterns, among entity data and sentiment data for the particular subject matter, that correlate strongly with predictions for events that are analogous to the target event.

The network obtains unstructured data in block 104 and structured data (e.g., predictions for the probability of the target event from other prediction sources) in block 106. In some embodiments this unstructured data may be a compilation of statistics that may be relevant to the subject matter and natural language sources such as blog posts and articles. In some embodiments the structured data may comprise predictions that are analogous to the target prediction (e.g., predictions for other, related events) or predictions of the probability of the same event, but generated by a different source (e.g., a sports journal if the subject matter is baseball, or a political pundit if the subject matter is the outcome of a political election). In some embodiments the structured data and unstructured data may be obtained simultaneously, one after the other, or continually. For example, in some embodiments the structured and unstructured data may be part of a large database that is updated periodically as new data sources are discovered (e.g., new social-media posts may periodically be added to the unstructured data and new predictions may be added to the structured data). This may be particularly beneficial with regards to subject matters about which large amounts of data is produced regularly, as is often true in socially oriented fields such as fantasy sports.

In some embodiments, the structured and unstructured data may be obtained prior to the neural network being trained in block 102. In these embodiments, a portion of the structured and unstructured data may be utilized in training the neural network. This may be suitable, for example, for predictions related to subject matters for which a very large amount of data exists, but for which the data does not change frequently.

In block 108, the structured and unstructured data is processed to identify word lists that are to be input into a probability generator. In some embodiments only one type of word may be identified, (e.g., words of the "entity" word type), whereas in other embodiments multiple word types may be identified. In the former embodiments, one word-type list (i.e., one word list composed of words of a single type) may be identified, whereas in the latter embodiments multiple word type lists (i.e., multiple word lists, each composed of words of a different type) may be identified. For example, an entity-model neural network may process both the structured and unstructured data to determine a list of entities in the data that may be relevant to the target prediction. Further, a concept mapper, such as an ontology database, may be cross-referenced with the data sources to determine a list of higher-level concepts pertaining to the subject matter and relevant to the prediction. For example, several concepts related to a prediction of the outcome of a political race may be "presidency," "polling," "nomination," etc. In some embodiments, a list of entities may be queried in a concept mapper, which may then produce a list of concepts that are related to the entities. Alternatively, a collection of unstructured data sources may be mapped to a concept-mapper database to determine the list of concepts within the data sources that are found within the mapper database.

In some embodiments, the list of word types may include a list of keywords that may or may not overlap with a list of entities and a list of concepts. These keywords may be identified, for example, by a process that chooses the X most frequently used words in a collection of unstructured data (e.g., the ten most frequently used words, or the two hundred most frequently used words), natural language processing techniques that are able to identify the semantically important words in the collection, or a neural network that is trained to express the words in the collection in a vector space and choose the word vectors in the space that are located closest to each other (e.g., the Word2vec algorithm). A word vector, as used herein, may refer to a column vector or a row vector, or, in other words, a matrix consisting of a single column of elements or row of elements. The number of elements in the column or row is referred to herein as the "dimensions" of the vector. The dimensions of the vector space in which these vectors may be imbedded may be interpreted by the dimensions of the vectors.

For example, a set of 2-dimensional vectors (i.e., a set of 2-by-1 matrixes) may be embedded in a 2-dimensional vector space with, for example, an X axis and a Y axis. In some instances, a Cartesian coordinate system may be embedded in this 2-dimensional vector space, and the two values of each vector may represent one point on the vector (e.g., the first value may represent the X-axis value of the point, and the second value may represent that Y-axis value of the point). The corresponding vector for each such point may be represented by a line embedded in that vector space that contains that such point and a point at the Cartesian coordinates (0, 0). In such an example, two vectors may be described as "near" each other (i.e., in "close proximity" to each other) if the lines representing those two vectors are separated by a relatively small distance (as opposed to the distance between the lines representing other vectors).

As a further example, a set of 3-dimensional vectors (i.e., a set of 3-by-1 matrixes) may be embedded in a 3-dimensional vector space (i.e., Euclidean space). Similar to the previous example, the values of each 3-by-1 matrix may correspond to a point on the vector. The vector may, for example, be represented by a line embedded in that vector space that contains that point and the point at (0, 0, 0). In some embodiments, words may be embedded in vectors with greater dimensions (e.g., 50 dimensions). In those embodiments, the corresponding vectors may be embedded in a vector space with a matching number of dimensions (e.g., 50 dimensions).

In block 110, the identified word lists and the unstructured data are input to a neural network that is trained to embed the words into vectors. In some embodiments, this neural network may embed words from the word lists in a vector space based upon similarity patterns recognized in the linguistic contexts of the words as used in the unstructured data. Vectors may be created such that words with similar linguistic context in the unstructured data may be located closer to one another in the vector space than the vectors of words with less-similar linguistic context. If, for example, the entities "cat," "dog," and "chair" were input into the neural network, the resulting vectors created for "cat" and "dog" may be located closer together in the vector space than the vectors for "dog" and "chair." In some embodiments, keywords identified in block 108 may be revectorized in block 110, or the vectors created in block 108, if any, may be reused.

In some embodiments vector lists may be created for each word-type list. For example, in some embodiments a first list of vectors may be created for entities, a second list for concepts, and a third list for keywords. The number of dimensions of the vectors produced may vary depending on the embodiment. For example, in some embodiments block 110 may produce 50-dimension vectors, whereas in other embodiments block 110 may produce 30-dimension vectors or 100-dimension vectors. The number of dimensions of the word vectors may be determined in part on the resources available to a probability generator into which the word vectors will be input. Generally, as the number of dimensions of a word vector increases, the burden on the network increases. Therefore, in some low-resource embodiments, low-dimension word vectors may be preferred. However, as the number of dimensions of a word vector decreases, the data expressed by that word vector typically decreases. In some embodiments, the factors related to accurate target predictions may be of sufficient complexity that very short (low-dimension) word vectors may not enable the probability generator to generate an accurate prediction. Thus, in some high-complexity embodiments, high-dimension word vectors may be preferred. In yet other embodiments, a balance between these, and other interests, may be sought when determining the desired dimensionality of word vectors.

In block 112, a sentiment score is identified for a word or words in at least one of the word lists. This sentiment score may be produced, for example, by a classifier-type neural network that is trained to ingest unstructured data, recognize words in that unstructured data, and output, for each word, a value that corresponds to the sentiment associated with that word within the unstructured data. For example, a value output by the sentiment classifier may be positive (for positive sentiment), negative (for negative sentiment) or 0 (for neutral/no sentiment). In some embodiments the absolute value of the sentiment score related to a word may indicate the magnitude of the sentiment associated with that word. For example, in a sentiment scale of 1.0 to −1.0, a sentiment score of 1.0 may be "very positive," whereas a sentiment score of −0.1 may be "slightly negative." These values are presented as examples only, in some embodiment any values may be utilized.

In some embodiments a sentiment score of a word as it is used across the unstructured data may be determined by determining the average of multiple separate sentiment scores for that word throughout the unstructured data. A separate sentiment score of a word may be determined for each sentence or phrase in which a word is found in all of the unstructured data. The sentiment score for that word may then be calculated by determining the average of all separate sentiment scores for that word. For example, a sentiment score for "Company A, Inc." as it is used across a corpus of two blog articles may be determined. In the first blog article, "Company A, Inc." may be used in two sentences. The first sentence may have a specific sentiment score of 0.25, and the second may have a specific sentiment score of 0.5 In the second blog article, "Company A, Inc." may be used in one sentence. The sentence may have a specific sentiment score of −0.3. The sentiment score of "Company A, Inc." across the entire corpus, then, would be the average of 0.25, 0.5, and −0.3 (i.e., 0.15).

In some embodiments, an average sentiment score of the entirety of the unstructured data may also be identified. This average sentiment score may be, for example, the average of all sentiment values for all identified words in the unstructured data. Continuing the example from the previous paragraph, "Company A, Inc.," "Company B," "stock market," "revenue stream," and "corporation" may be the five words identified in the structured data. If the average sentiment score for all words besides "Company A, Inc." are, hypothetically, −0.5 across the entirety of the unstructured data, the average sentiment score of the entirety of the unstructured data may be calculated as −0.37. This average sentiment score may then be used, for example, as a baseline sentiment against which the sentiment score of each word may be compared. For example, because the average sentiment score of the unstructured data is lower than the sentiment score of "Company A, Inc.," it may be determined that the sources of unstructured data are particularly negative, and that the score of "Company A, Inc." may be adjusted as a result (e.g., increased to account for the generally negative tone of the sources).

In some embodiments the words in the word lists identified in block 108 may be cross-referenced in block 114 with the words identified by the neural network in block 112. The sentiment scores for common words (i.e., words found in both sources) may be selected for use in prediction analysis. In some embodiments each word list may be cross-referenced with the sentiment scores identified in block 112, enabling the sentiment scores for corresponding to each word of each word list to be selected. In other embodiments, only certain word lists may be cross referenced. For example, in some embodiments only the "concepts" may be cross-referenced. In other embodiments only certain keywords identified in block 108 (e.g., the 50 most commonly used keywords or the 30 most contextually related keywords) may be cross-referenced. In some embodiments, cross-referencing sentiment scores identified in block 112 with the word lists identified in block 108 may assist in identifying sentiment scores that have relevance to a target prediction Eliminating sentiment scores that are likely to be irrelevant may greatly increase the benefit of incorporating sentiment data in prediction analysis, and may in turn increase the accuracy of the resulting prediction.

In some embodiments the sentiment score of a word or words may be determined before the word lists are identified in block 108 (e.g., if the sentiment score of all words in the structured data is being determined, or if the sentiment score of only the 100 most frequently used words is being determined). In other embodiments, the sentiment score or scores may be determined after the word lists are identified, but before the words in the word lists are embedded in vectors in block 110. In yet other embodiments, the sentiment score or scores may be determined after the words are embedded in block 110.

In block 116 the vectors created in block 110 and the sentiment scores determined in block 112 are input into a neural network specialized in recognizing patterns in word vectors and sentiment scores and outputting the probability that a target event is predicted to occur. For example, the neural network may be a classifier-type network. In some embodiments the ideal number of input vectors and sentiment scores to be input into the classifier-type neural network may be determined based on the problem the classifier-type neural network is solving (i.e., the target prediction). For example, in some embodiments 10 vectors and sentiment scores may be necessary for an accurate prediction, whereas in other embodiments 100 vectors and sentiment scores may be necessary. In some embodiments, the resources necessary to operate the neural network may increase as the number of inputs increases, and a balancing test between accuracy and resource requirements may be performed.

In block 118, the output of the classifier-type network is obtained. In some embodiments the classifier-type network may outputs two values: one value that represents the predicted probability that the target event will occur, and one value that represents the predicted probability that the target event will not occur. In some such embodiments, these values may be complementary such that, added together, they would represent a value of certainty (e.g., a value of 70% probability of occurrence and 30% probability of non-occurrence, where a value of 100% represents certainty, or a value of 0.7 probability of occurrence and 0.3 probability of non-occurrence, where 1.0 represents certainty). In some embodiments, only one prediction may be reported. In some such embodiments, only the prediction with the higher likelihood (e.g., non-occurrence of a target event) may be reported. In other embodiments, only the prediction of occurrence of a target event may be reported.

As discussed in relation to FIG. 1, in some embodiments of the present invention, an aggregate predictor neural network may comprise specialized neural networks that are trained to prepare unstructured and structured data for a probability-generator neural network. In some embodiments different data types may require different neural networks, or groups of neural networks, to be prepared for a probability generator.

Figure 2:
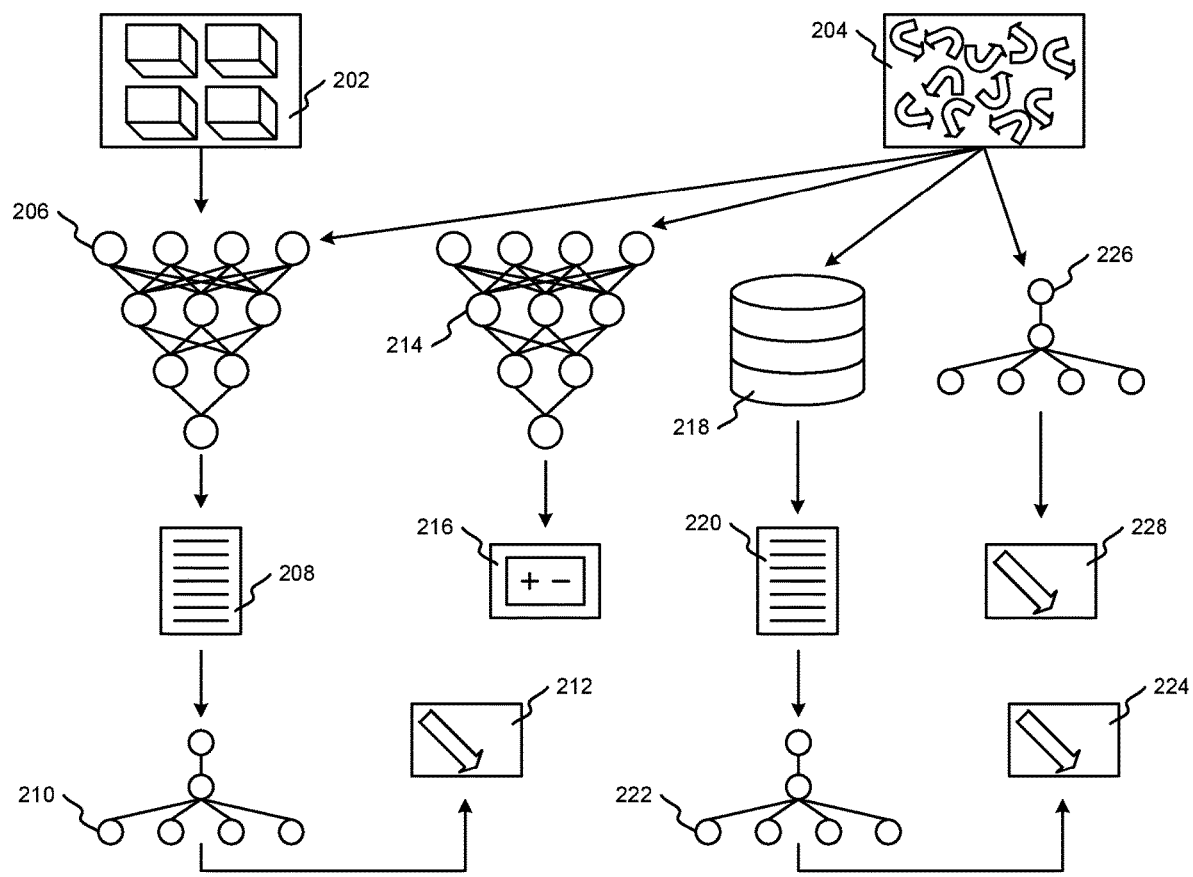
FIG. 2 illustrates one representation of a set of neural networks in a larger aggregate neural network that may prepare input data for a probability-generator neural network, in accordance with embodiments.

FIG. 2 illustrates one representation of a set of neural networks in a larger aggregate neural network that may prepare input data for a probability-generator neural network. Structured data 202 and unstructured data 204 represent the base inputs to the neural network. Structured data 202 and unstructured data 204 are inputs into neural network 206, which may be trained in the vocabulary of the subject matter to which the structured data 202 and unstructured data 204 pertains. Neural network 206 may also be trained to recognize patterns in the structured data 202 and unstructured data 204, and identify a word list based on those patterns. For example, in some embodiments neural network 206 may comprise an entity model that identifies a list of entities 208 within the unstructured data 204 that may be relevant to a target prediction. In other embodiments, however, other types of word lists are possible.

The list of entities 208 is input into neural network 210. Neural network 210 may be specialized to process the list of entities 208 and output at least one feature vector 212. In some embodiments, feature vector 212 may be a numerical feature vector. In some embodiments, for example, neural network 210 may analyze the unstructured data and determine the contextual relationship of each entity in the list of entities 208 to the remainder of the structured data. Neural network 210 may then assign numerical values to the corresponding word vectors of those entities such that entities with close contextual relationships are situated in close proximity in a vector space. Thus, in some embodiments, feature vector 212 may contextually describe an entity based on the perceived relationships of the entity to the other words used in structured data 204. In some embodiments, feature vector 212 may actually represent multiple feature vectors (e.g., one vector for each entity in the list of entities 208). In other embodiments, only one vector may be produced.

Unstructured data 204 is also input into neural network 214, which may be a sentiment classifier neural network. Neural network 214 may process the unstructured data to identify words used throughout the unstructured data to which sentimental context may be ascribed. In some embodiments, this processing may involve tokenizing the unstructured data (i.e., dividing the data into small sections, such as words, that may be easily identified and processed). In some embodiments, only the most-used words (e.g., the 100 most-used words and the top 10% of words when each word is ranked by usage).

Neural network 214 may output sentiment score 216. Sentiment score 216 may take the form of a value within a predetermined range of values (e.g., 1.0 to −1.0) that measures the type of sentiment and magnitude of sentiment associated with a word in a word list identified from within structural data 204. For example, sentiment score 216 may be the sentiment in structured data 204 that is associated with an entity in the list of entities 208. In some embodiments, list of entities 208 may cross-referenced with the output of neural network 214 to identify relevant sentiment scores. In some embodiments, neural network 214 may also output an average sentiment score of the entire structured data 204. This average sentiment score may also be utilized in prediction analysis.

Unstructured data 204 is also input to concept mapper 218. Concept mapper 218 may comprise a database of entities and semantic "facts" about those entities. Those semantic "facts" may include a list of higher-level concepts associated with the entities in the database. Concept mapper 218 may ingest unstructured data 204 and map the words found therein to a list of concepts associated with those entities. In some embodiments, this may include tokenizing the unstructured data and detecting words found in the tokens that are also found in the database of entities. The concepts that are associated with those words may then be determined based on the relationships in the database, and output as concept list 220.

In some embodiments, entity list 208 may also be input into 218 with, or instead of, unstructured data 204. In those embodiments, concept mapper 218 may match the entities found in entity list 208 with entities found in the database associated with concept mapper 218. Concept associations may be identified for any entities that are also found within the database. The concepts identified by those associations may then be output to concept list 220.

In some embodiments, concept list 220 may also be input into neural network 214 with unstructured data 204. Neural network 214 may then determine a sentiment score 216 for at least one concept in the list of concepts 220. This sentiment score may reflect the sentiment associated with the at least one concept in the unstructured data 204. In some embodiments a separate sentiment score 216 may be determined for each concept in list of concepts 220.

The list of concepts 220 is input into neural network 222. In some embodiments, neural network 222 may be a distinct neural network from neural network 210. In other embodiments neural networks 210 and 222 may be the same network. Neural network 222 may be specialized to process the list of concepts 220 and output at least one feature vector 224. In some embodiments, feature vector 224 may be a numerical feature vector. In some embodiments, feature vector 212 may contextually describe a concept based on the perceived relationships of the concept to the other words used in structured data 204. In some embodiments, feature vector 224 may actually represent multiple feature vectors (e.g., one vector for each concept in the list of concepts 220). In other embodiments, only one vector may be produced.

Unstructured data 204 may also be input into neural network 226. In some embodiments, neural network 226 may be a distinct neural network from neural network 210 and neural network 222. In other embodiments neural networks 210, 222, and 226 may all be the same network. Neural network 226 may be specialized in processing the unstructured data an identifying words that, based on their usage or contextual relationships, may be relevant to a target prediction (referred to herein as "keywords"). Neural network 226 may, for example, select keywords based on the frequency of use within the unstructured data 204. Neural network may then vectorize the selected keywords into at least one feature vector 228.

Neural network 226 may also vectorize the words in unstructured data 204, embedding the vectorized words into a vector space. The vector properties may be created such that the vectors of contextually similar words (based on the usage in unstructured data 204) are located are located in closer proximity in that vector space than vectors of contextually dissimilar words. Neural network 226 may then select word vectors based on the proximity of those word vectors to other word vectors. Selecting word vectors that are located near many other word vectors in the vector space increases the likelihood that those word vectors share contextual relationships with many other words in unstructured data 204, and are thus likely to be relevant to a target prediction. The words embedded in these word vectors may represent "keywords" of the unstructured data 204.

The word vectors produced and selected by neural network 226 may be output as at least one feature vector 228. In some embodiments, feature vector 228 may be a numerical feature vector. In some embodiments, feature vector 228 may contextually describe a keyword based on the perceived relationships of the keyword to the other words used in unstructured data 204. In some embodiments, multiple feature vectors 228 may be output by neural network 226. For example, neural network 226 may be specialized to vectorize and output as feature vectors the 500 words that are used the most frequently in unstructured data 204. In other embodiments, neural network 226 may be specialized to output the 500 feature vectors that have the closest distances to at least a threshold amount of other feature vectors in the vector space.

In some embodiments, the keyword or keywords embedded in feature vector 228 or feature vectors 226 may be input into neural network 214 with unstructured data 204. Neural network 214 may then determine a sentiment score 216 for at least one keyword. This sentiment score may reflect the sentiment associated with the at least one keyword in the unstructured data 204. In some embodiments a separate sentiment score 216 may be determined for each identified keyword.

In some embodiments, a neural network may utilize some or all of the outputs of neural networks 210, 214, 222, and 226 to predict the probability of a target event occurring. The neural network may be specialized to process a vector or set of vectors into which a word type (e.g., an entity, a concept, or a keyword) has been embedded. The neural network may also be specialized to process a sentiment score for at least one word in associated with at least one vector. The neural network may output a predicted probability that the target event will occur.

Figure 3:
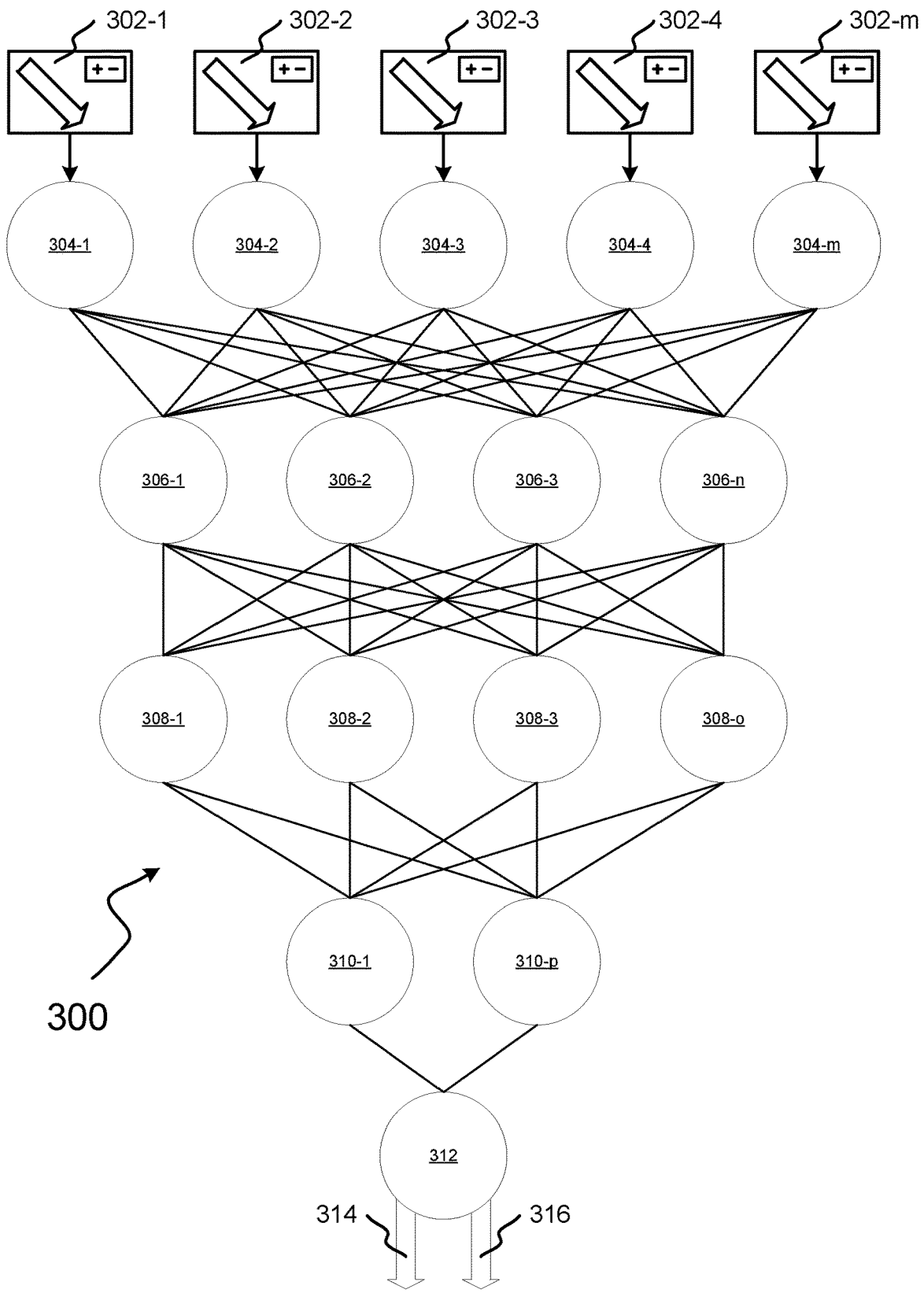
FIG. 3 depicts an example neural network 300 that may be specialized to process a vector or set of vectors associated with a word type (e.g., entity vectors), in accordance with embodiments.

FIG. 3 depicts an example neural network 300 that may be specialized to process a vector or set of vectors associated with a word type (e.g., entity vectors). The neural network 300 may also be specialized to process at least one sentiment score associated with a word embedded within a vector. For example, neural network 300 may be specialized to process one or more outputs of the one or more neural networks disclosed in FIG. 2. In some embodiments, for example, neural network 300 may be specialized to process feature vector 212 (or multiple feature vectors 212) and sentiment score 216 (or multiple sentiment scores 216) of FIG. 2. In other embodiments, neural network 300 may be specialized to process, for example, feature vector 228 (or multiple feature vectors 228) from FIG. 2.

Neural network 300 may be a classifier-type neural network. Neural network 300 may be part of a larger neural network. For example, neural network 300 may be nested within a single, larger neural network, connected to several other neural networks, or connected to several other neural networks as part of an overall aggregate neural network.

Inputs 302-1 through 302-$m$ represent the inputs to neural network 300. In this embodiment, 302-1 through 302-$m$ do not represent different inputs. Rather, 302-1 through 302-$m$ represent the same input that is sent to each first-layer neuron (neurons 304-1 through 304-$m$) in neural network 300. In some embodiments, the number of inputs 302-1 through 302-$m$ (i.e., the number represented by m) may equal (and thus be determined by) the number of first-layer neurons in the network. In other embodiments, neural network 300 may incorporate 1 or more bias neurons in the first layer, in which case the number of inputs 302-1 through 302-$m$ may equal the number of first-layer neurons in the network minus the number of first-layer bias neurons. In some embodiments, a single input (e.g., input 302-1) may be input into the neural network. In such an embodiment, the first layer of the neural network may comprise a single neuron, which may propagate the input to the second layer of neurons.

Inputs 302-1 through 302-$m$ may comprise a single feature vector that contextually describes a word from a set of unstructured data (e.g., a corpus of natural language sources) and a sentiment score that is associated with the word described by the feature vector. Inputs 302-1 through 302-$m$ may also comprise a plurality of vectors and associated sentiment scores. For example, inputs 302-1 through 302-$m$ may comprise 100 word vectors that describe 100 entities and 100 sentiment scores that measure the sentiment associated with the 100 entities that the 100 word vectors describe. In other embodiments, not all word vectors input into neural network 300 may be associated with a sentiment score. For example, in some embodiments, 30 word vectors may be input into neural network 300, but only 10 sentiment scores (associated with 10 words described by 10 of the 30 word vectors) may be input into neural network 300.

Neural network 300 comprises 5 layers of neurons (referred to as layers 304, 306, 308, 310, and 312, respectively corresponding to illustrated nodes 304-1 to 304-$m$, nodes 306-1 to 306-$n$, nodes 308-1 to 308-$o$, nodes 310-1 to 310-$p$, and node 312). In some embodiments, neural network 300 may have more than 5 layers or fewer than 5 layers. These 5 layers may each comprise the same amount of neurons as any other layer, more neurons than any other layer, fewer neurons than any other layer, or more neurons than some layers and fewer neurons than other layers. In this embodiment, layer 312 is treated as the output layer. Layer 312 outputs a probability that a target event will occur, and contains only one neuron (neuron 312). In other embodiments, layer 312 may contain more than 1 neuron. In this illustration no bias neurons are shown in neural network 300. However, in some embodiments each layer in neural network 300 may contain one or more bias neurons.

Layers 304-312 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 304 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 306, for example, may be a dense layer. In this example, the dense layer may process and reduce the dimensions of the feature vector (i.e., the vector portion of inputs 302-1 through 302-$m$) to eliminate data that is not contributing to the prediction. As a further example, layer 308 may be a "batch normalization" layer. Batch normalization may be used to normalize the outputs of the batch-normalization layer to accelerate learning in the neural network. Layer 310 may be any of a dropout, hidden, or batch-normalization layer. Note that these layers are examples. In other embodiments, any of layers 304 through 310 may be any of dropout, hidden, or batch-normalization layers. This is also true in embodiments with more layers than are illustrated here, or fewer layers.

Layer 312 is the output layer. In this embodiment, neuron 312 produces outputs 314 and 316. Outputs 314 and 316 represent complementary probabilities that a target event will or will not occur. For example, output 314 may represent the probability that a target event will occur, and output 316 may represent the probability that a target event will not occur. In some embodiments, outputs 314 and 316 may each be between 0.0 and 1.0, and may add up to 1.0. In such embodiments, a probability of 1.0 may represent a projected absolute certainty (e.g., if output 314 were 1.0, the projected chance that the target event would occur would be 100%, whereas if output 316 were 1.0, the projected chance that the target event would not occur would be 100%).

FIG. 3 illustrates an example probability-generator neural network with one pattern-recognizer pathway (i.e., a pathway of neurons that processes one set of inputs and analyzes those inputs based on recognized patterns, and produces one set of outputs. However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

Figure 4:
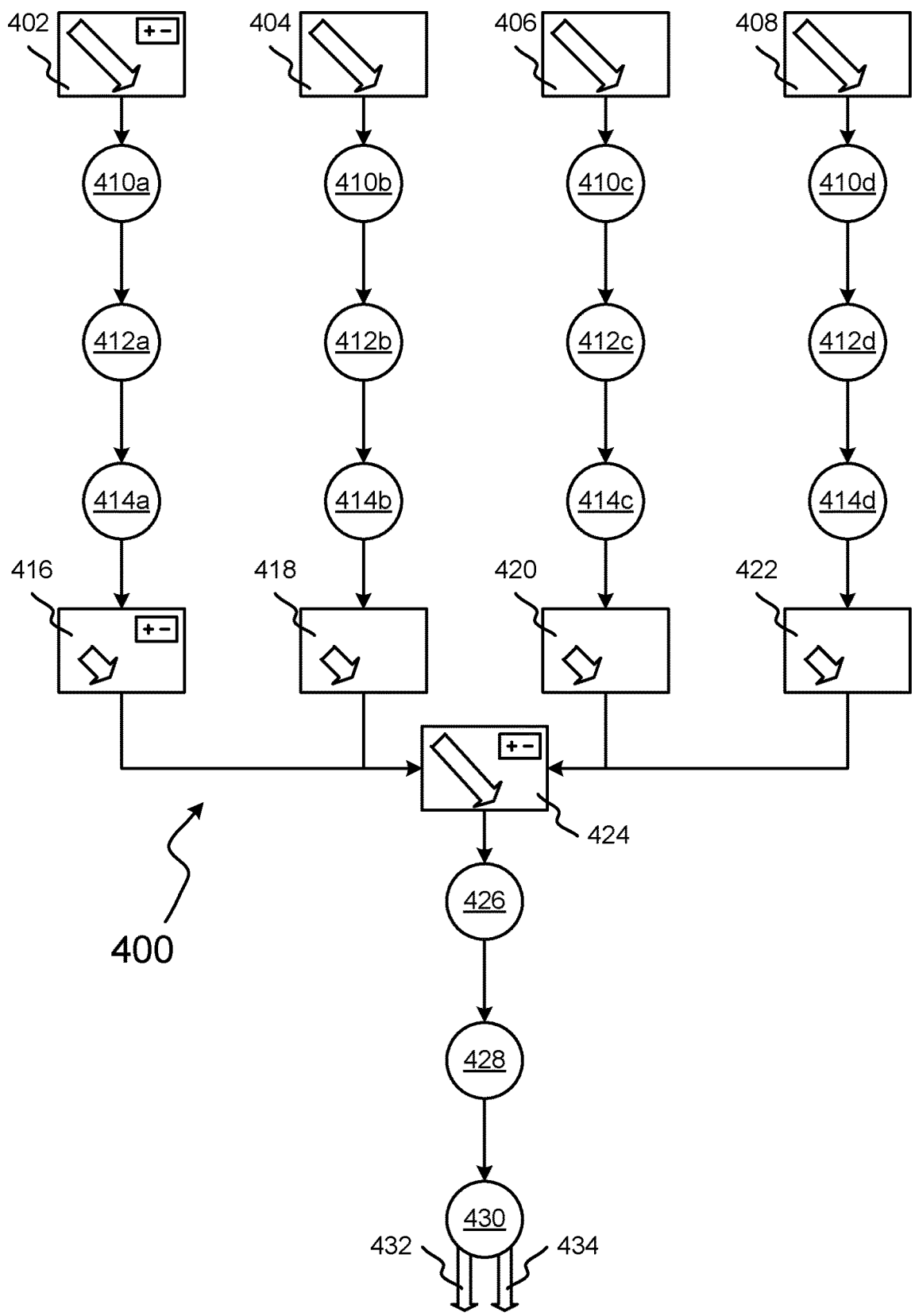
FIG. 4 illustrates an example probability-generator neural network 400 with multiple pattern recognition pathways and multiple sets of inputs, in accordance with embodiments.

FIG. 4 illustrates an example probability-generator neural network 400 with multiple pattern recognition pathways and multiple sets of inputs. For example, inputs 402, combined with layers 410a-414a may represent the first several layers of a pattern-recognizer pathway similar to pattern-recognizer pathway 300 of FIG. 3. For example, input 402 may comprise an entity feature vector or multiple entity vectors and at least one sentiment score for at least one corresponding entity. Input 404 may comprise one or more concept feature vectors and input 406 may comprise one or more keyword feature vectors. Input 408 may be, for example, a sentiment feature vector. The sentiment feature vector may, for example, be composed of sentiment scores for a plurality of entities, keywords, and concepts across a corpus of natural-language sources, embedded into a vector form. For example, a sentiment vector may provide sentiment context for each entity in a group of entities. A sentiment vector may also provide an average sentiment context over a group of keywords. In some embodiments, each feature vector in inputs 402 through 408 may be the same length (e.g., 50 dimensions). In other embodiments each feature vector may have a unique length.

Neural network 400 contains, through the first several layers, four pathways. Several pathway layers (i.e., group of neurons that make up the layer in the pathway) are presented for each pathway. For example, the pathway corresponding to input 402 has three layers shown: 410a, 412a, and 414a. Layer 410a may consist of, for example, 5 neurons that are unique to layer 410a. Layers 410b, 410c, and 410d, of the pathways corresponding to inputs 404, 406, and 408 respectively, may contain 5 corresponding neurons. In other words, the 410 layer of each pathway may contain the same neurons with the same activation function. However, weights distributed among those neurons may differ among the pathways, as may the presence and properties of bias neurons. This may also be true of the 412 layer and 414 layer of each pathway. Each of layers 410a-410d, 412a-412d, and 414a-414d may be a dropout layer, a hidden layer, and a batch-normalization layer. In some embodiments each pathway may have several more layers than are illustrated. For example, in some embodiments each pathway may consist of 8 layers. In other embodiments, the non-input and non-output layers may be in multiples of three. In these embodiments, there may be an equal number of dropout, hidden, and batch normalization layers between the input and output layers.

The outputs of layers 414a-414d are outputs 416-422 respectively. Outputs 416-422 represent the inputs 402-408, however the respective feature vectors have been shortened (i.e., the dimensions of the vectors have been reduced). This reduction may occur, in each pathway, at the hidden layers. The reduction in vector dimensions may vary based on implementation. For example, in some embodiments the vectors in outputs 416-422 may be approximately 50% the length of the vectors in inputs 402-408. In other embodiments, the outputs may be approximately 25% of the length of the inputs. In some embodiments, the length of the output vectors may be determined by the number of hidden layers in the associated pathways and the extent of the vector-length reduction at each hidden layer.

Outputs 416-422 are be combined into a single input/output 424, which may comprise a single vector representing the vectors from outputs 416-422 and the sentiment score obtained from output 416. At this point, all four pathways in the network merge to a single pattern-recognition pathway. This merger may increase the ability to correlate evidence found in each pathway up to this point (e.g., to determine whether patterns being recognized in one pathway are also being recognized in others). This correlation, in turn, may enable the elimination of false-positive patterns and increase the network's ability to identify additional patterns among the merged data. Layer 426 of that pathway may comprise any number of neurons, which may provide inputs for the neurons of layer 428. These layers may provide inputs for the neurons at layer 430, which is the output layer for the network. In some embodiments, layer 430 may consist of a single output neuron. Layer 430 generates two probabilities, represented by output 432 and output 434. Output 432 may be the predicted probability that a target event will occur, and output 434 may be the predicted probability that a target event will not occur. In this illustration two layers are presented between input/output 424 and output layer 430. However, in some illustrations more or fewer layers may be present after the pathway merge.

Some embodiments of the present disclosure may obtain a composite projection associated with a subject matter based on several neural-network projections for target events associated with the subject matter and other projections available within structured data. In such embodiments, the probabilities of several related or unrelated potential future events may be projected and combined with structured data. A processor configured to perform large-scale multiple regression analysis may combine the projected probabilities with structure data to determine a composite projection.

This may be beneficial, for example, when attempting to determine the value of a share of a particular stock based on several projected performance metrics associated with the stock. In this example, public opinion of a company associated with the stock, expressed, for example, in blogs and articles, may be utilized as unstructured data. Third-party projections of the stock may be utilized as structured data. Similarly, this could also be beneficial to generate a projection of the acquisition value of a company based on several projected events associated with the company, such as key employee retention after acquisition, success of a company product, or others. In this example, employee communications may be utilized as structured data, and third-party valuations of the company and a list of the company assets, debts, and income may be utilized as structured data. Finally, this may be valuable in social competitions surrounding sports statistics, such as fantasy baseball, fantasy basketball, and fantasy football.

Figure 5:
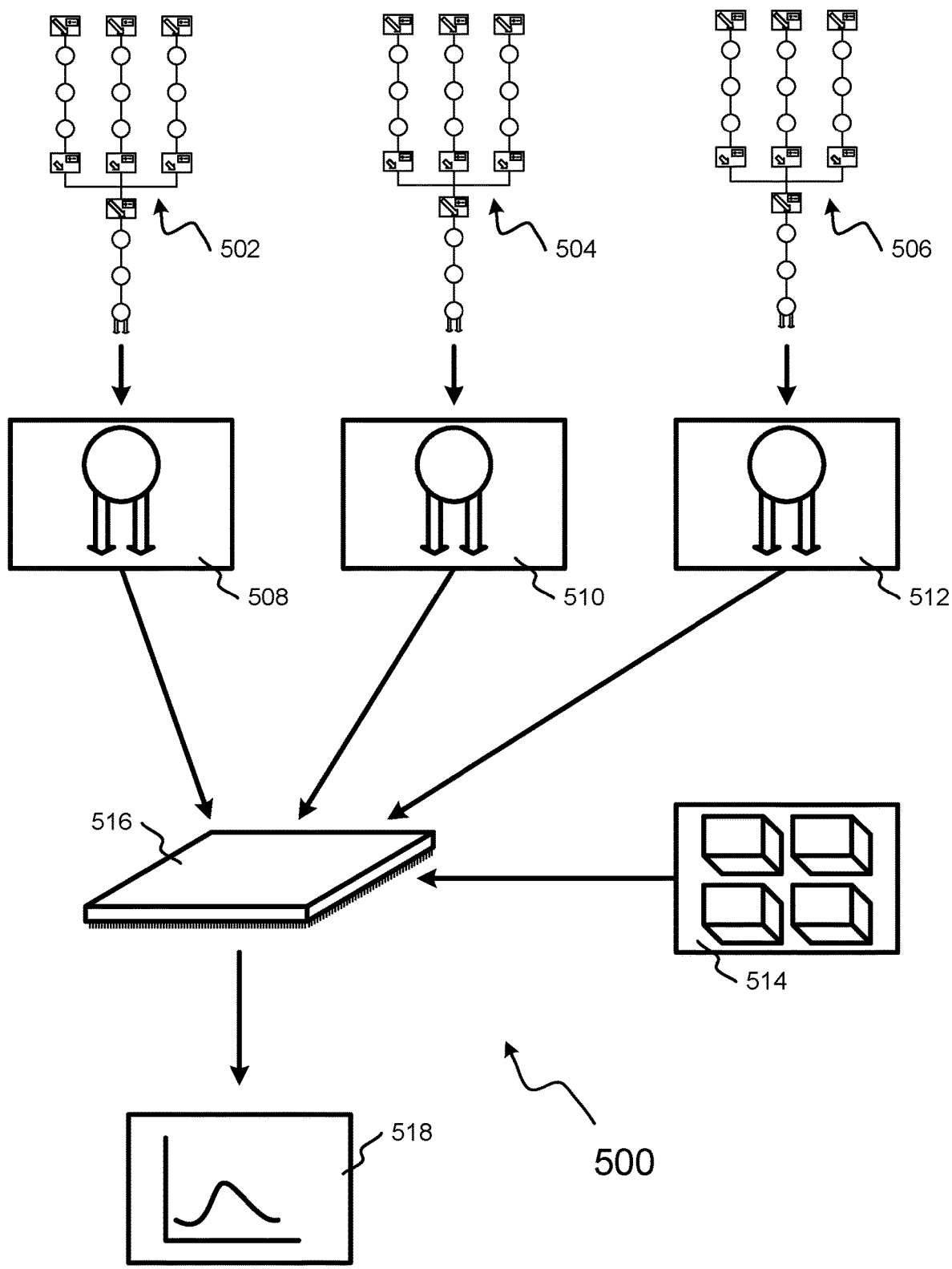
FIG. 5 illustrates a representation of a system 500 that utilizes multiple probability-generation neural networks and structured data to generate a composite projection, in accordance with embodiments.

FIG. 5 illustrates a representation of a system 500 that utilizes multiple probability-generation neural networks and structured data to generate a composite projection. For example, system 500 may be beneficial for predicting the score a player is likely to be awarded in a fantasy football league in an upcoming week. System 500 utilizes neural networks 502, 504, and 506. Neural networks 502, 504, and 506 may be similar to neural network 400, each comprising multiple pathways similar to neural network 300, and utilizing inputs similar to feature vectors 212, 224, and 228 as well as sentiment score(s) 216. At least one of neural networks 502, 504, and 506 may also utilize a sentiment feature vector similar to the sentiment feature vector of input 408.

For example, system 500 may utilize unstructured data, such as sports articles, blog postings about football, social-media posts about football players, sports statistics, etc. System 500 may utilize structured data, such as projections of team and player performances, likelihood of players playing, etc. released by popular sports journalism organizations. These sources may be processed by a specialized neural network associated with system 500 that may determine a list of relevant entities associated with the subject matter. For example, an upcoming contest between two teams, a player's name, or a team's name may be relevant entities. That relevant list of entities may then be vectorized by a second neural network and input, as a vector, into the first pathways of each of neural networks 502, 504, and 506. The sentiment scores associated with the entities in the list of entities may also be determined and input into the first pathways of neural networks 502, 504, and 506 with the entity feature vectors. Similarly, higher-level concepts associated with sports, such as "football" "team" and "game" may be associated with the entities in the list of entities, and embedded in feature vectors as well. These feature vectors may be input into the second pathways of neural networks 502, 504, and 506. The sentiment scores associated with the concepts in the list of concepts may also be determined and input into the second pathways of neural networks 502, 504, and 506 with the concept feature vectors. Relevant keywords may be selected by a neural network based on identified contextual relationships and embedded into keyword feature vectors. A sentiment score may also be determined for each identified keyword. Together, keyword feature vectors and associated sentiment scores may be inputted into the third pattern recognizer pathway in each of neural networks 502, 504, and 506.

In some embodiments, neural networks 502, 504, and 506 may be specialized in predicting the probabilities (e.g., expected values) of different target events. In these embodiments, the lists of entities, keywords, and concepts, that may be relevant to each of neural networks 502, 504, and 506 may differ. For that reason, each of neural networks 502, 504, and 506 may accept different groups of feature vectors.

In some embodiments one or more of neural networks 502, 504, and 506 may specialize in processing at least a fourth vector type. For example, each of neural networks 502, 504, and 506 may comprise a fourth pathway that is specialized in processing a sentiment feature vector.

Neural networks 502, 504, and 506 may output probabilities 508, 510, and 512 respectively. Probabilities 508, 510, and 512 may be any projection of a target event associated with a particular player occurring. For example, probability 508 may be the probability that a player will play with an "injured" status. Probability 510 may be the probability that a player is likely to have a "breakout" game (i.e., a game in which the player performs particularly well, such as a game in which the player scores above an average amount of fantasy-football points, scores a threshold amount of fantasy-football points or higher, runs for a threshold number of yards or higher, or records a threshold number of tackles or higher). Probability 512 may be the probability that a player is likely to have a "bust" game (i.e., a game in which a player performs particularly poorly, such as a game in which the player scores below an average amount of fantasy-football points, scores a threshold amount of fantasy-football points or lower, throws a threshold number of interceptions or more, or scores a threshold number of touchdowns or fewer).

In this illustration of system 500, only three probability-generator neural networks have been depicted. However, in some embodiments of system 500 further probability-generator neural networks may be utilized. For example, a fourth probability-generator neural network may be utilized to determine the projected probability that a player is likely to play without an "injured" status. In other embodiments fewer than three probability-generator neural networks may be utilized, such as embodiments that only project a probability that a player will have a "breakout" game or that a player will play with an "injured" status.

Probabilities 508, 510, and 512 are input, with structured data 514, into processor 516, which is configured to perform a multiple-regression analysis. This multiple-regression analysis may be utilized to develop an overall projection 518, which may be calculated in terms of confidence intervals. For example, processor 516 may be utilized to project an overall projected fantasy football score for a particular player based on the projected probabilities 508, 510, and 512 associated with that player and any similar projections that may be identified in structured data 514. This fantasy football score may be presented in confidence intervals based on the output of the multiple-regression analysis. For example, it may be determined to be 20% likely that a player will score 20 or more points, but 60% likely that a player will score 15 or more points, and 90% likely that a player will score 5 or more points.

While system 500 was discussed in reference to a composite projection associated with fantasy sports, system 500 may be used to generate a composite prediction in many other subject matters. As previously discussed, systems such as system 500 may be particularly beneficial when projecting the value of a share of stock or the value of a company that may be subject to an acquisition. System 500 may also be utilized to determine the likely outcome of a political race (e.g., the projected percentage vote a candidate may receive, expressed in confidence intervals), legislative vote (e.g., the projected percentage vote a bill may receive, expressed in confidence intervals), or court case (e.g., the projected number of judges on a panel to decide in one direction or another, expressed in confidence intervals), among others.

As used herein, the term "neural network" may refer to an aggregate neural network that comprises multiple sub neural networks, or a sub neural network that is part of a larger neural network. Where multiple neural networks are discussed as somehow dependent upon one another (e.g., where one neural network's outputs provides the inputs for another neural network), those neural networks may be part of a larger, aggregate neural network, or they may be part of separate neural networks that are configured to communicate with one another (e.g., over a local network or over the internet).

Figure 6:
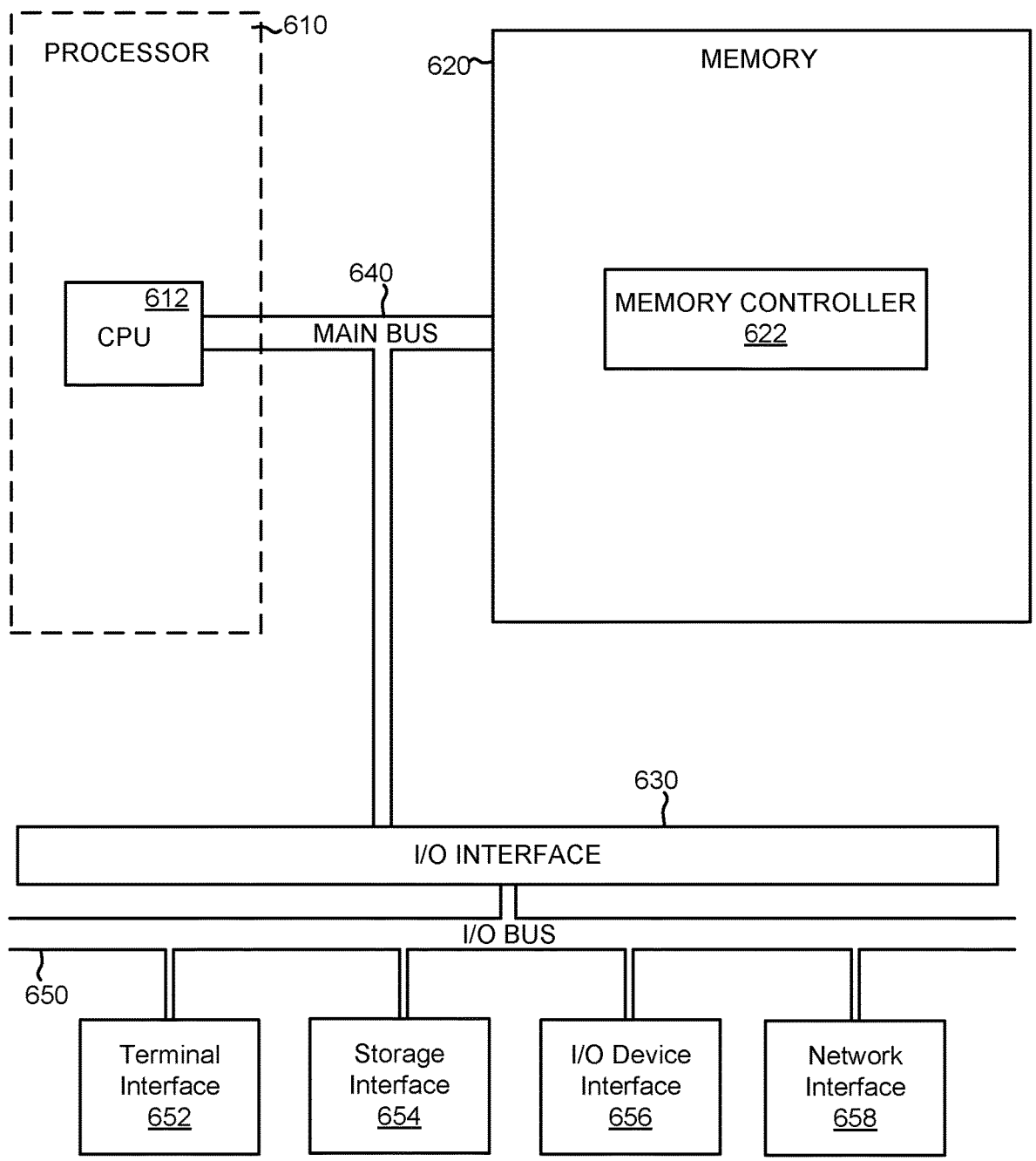
FIG. 6 illustrates the representative major components of a computer system that may be used in accordance with embodiments.

FIG. 6 depicts the representative major components of an exemplary Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or nonvolatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
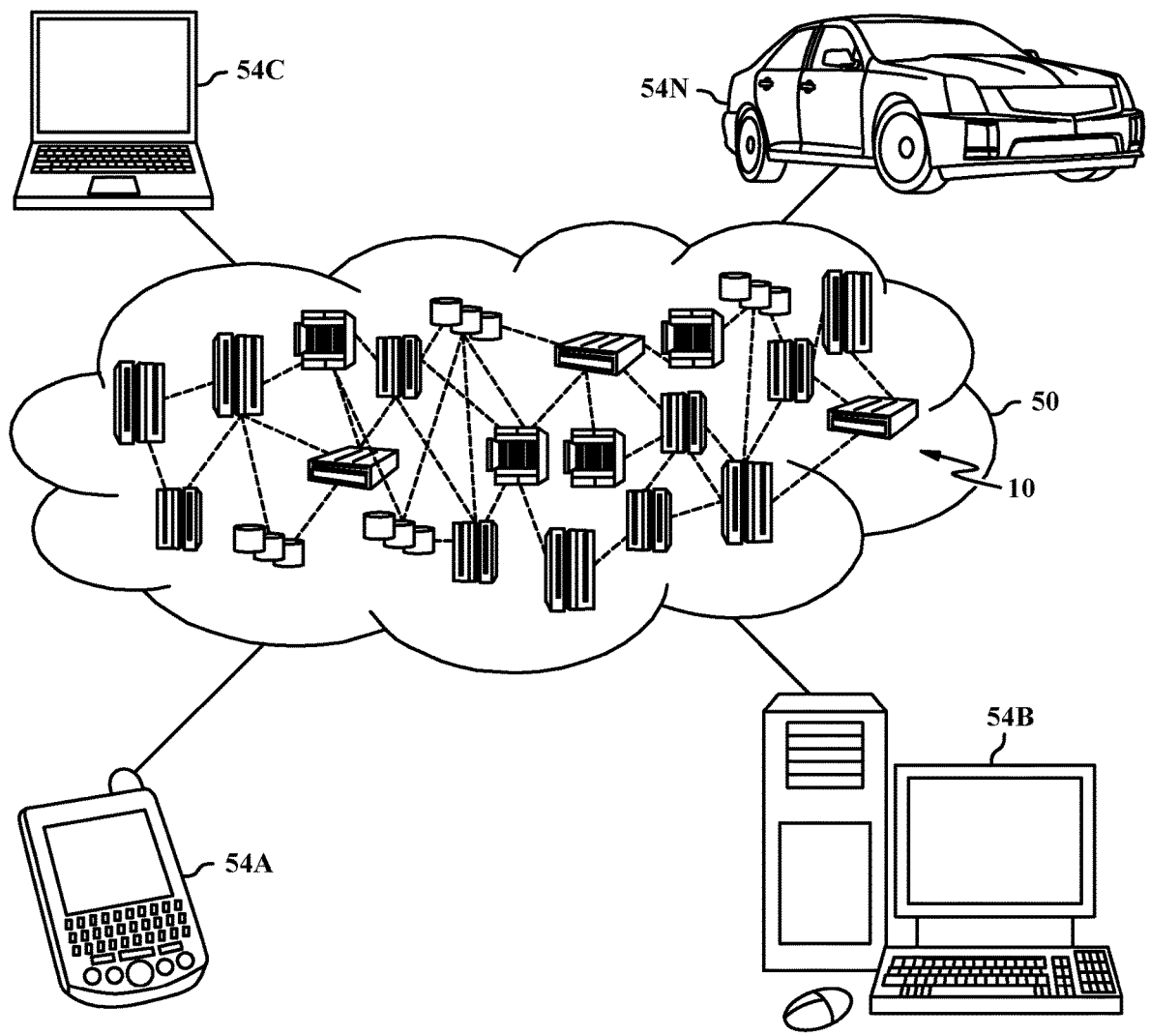
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
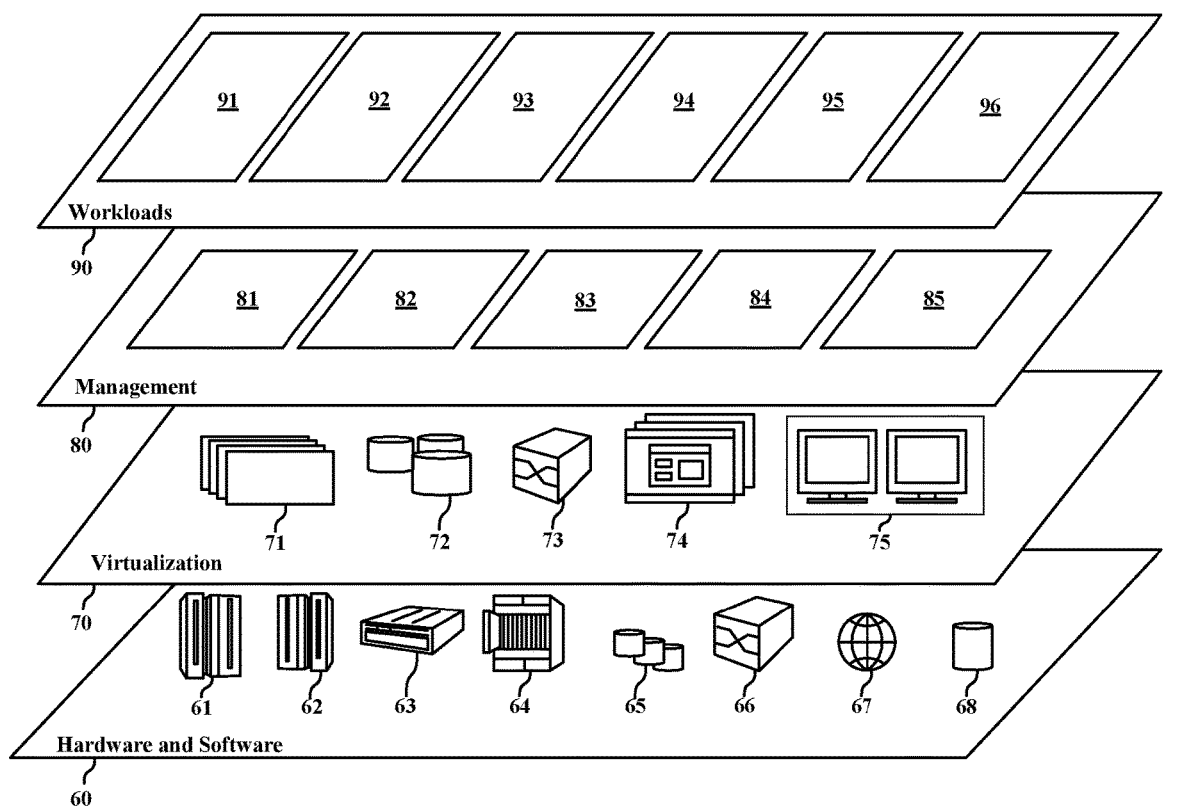
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a "set" of an object does not equate to all available instances of that object. For example, if four files were available, a set of files may not contain all four files. Further, as used herein, the phrase "each of a set" of an object refers only to the instances of that object of that set. For example, if four files were available, the phrase "a set of two files from the four files, each of the files in the set being read only" would properly be interpreted as implying that two files (the two files in the set) are read only. The two files of the four available files that are not in the set may or may not be read only.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   obtaining a first set of entity vectors, wherein each entity vector in the first set of entity vectors is a multi-dimensional vector that is associated with and describes a token from a first set of tokens from a corpus of sources, wherein the description is based in part on a relationship of the token to at least a portion of the remainder of the corpus of sources, and wherein the corpus of sources contains at least one natural-language source;
   obtaining a first set of sentiment scores, wherein each sentiment score in the first set of sentiment scores describes a sentiment associated with a corresponding token that is described by a vector in the first set of entity vectors;
   inputting the first set of entity vectors and the first set of sentiment scores into a first pattern-recognizer pathway in a first neural network; and
   generating, by the first neural network and based on the first set of entity vectors and the first set of sentiment scores, a first probability value of a first potential future event
   wherein the generating the first probability value comprises:
   reducing, by the first pattern-recognizer pathway, a first dimension of each entity vector in the first set of entity vectors, resulting in a first set of reduced entity vectors;

reducing, by a second pattern-recognizer pathway, a second dimension of each keyword vector in a first set of keyword vectors, resulting in a first set of reduced keyword vectors;

reducing, by a third pattern-recognizer pathway, a third dimension of each concept vector in a first set of concept vectors, resulting in a first set of reduced concept vectors;

merging each of the reduced vectors in the first set of reduced entity vectors with a corresponding vector in the set of reduced keyword vectors and a corresponding vector in the set of reduced concept vectors, resulting in a set of merged vectors; and inputting the merged vectors in the set of merged vectors into a fourth pattern-recognizer pathway in the first neural network.

2. The method of claim 1, further comprising:

obtaining a second set of entity vectors, wherein each entity vector in the second set of vectors is a multi-dimensional entity vector that describes an entity from the corpus of sources, wherein the description is based in part on a relationship of the entity to at least a portion of the remainder of the corpus;

obtaining a second set of sentiment scores, wherein each sentiment score in the second set of sentiment scores describes a sentiment associated with a corresponding entity that is described by an entity vector in the second set of entity vectors;

inputting the second set of entity vectors and the second set of second sentiment scores into a fifth pattern-recognizer pathway in the first neural network, wherein the first pattern-recognizer pathway and the fifth pattern-recognizer pathways are separate pathways prior to generating the first probability value and the second probability value; and generating, by the first neural network and based on the second set of entity vectors and the second set of sentiment scores, a second probability value of a second potential future event.

3. The method of claim 2, further comprising creating, by a multiple-regression analysis, an overall projected score, wherein the creating comprises:

inputting the first probability value into a multiple-regression function;

inputting the second probability value into the multiple-regression function;

inputting at least one portion of structured data into the multiple-regression function; and calculating the overall projected score based on the output of the multiple-regression function.

4. The method of claim 1, further comprising:

obtaining the first set of keyword vectors, wherein each keyword vector in the first set of keyword vectors is a multi-dimensional vector that describes a keyword from the corpus of sources;

inputting the first set of keyword vectors into the second pattern-recognizer pathway in the first neural network;

obtaining the first set of concept vectors, wherein each concept vector in the first set of concept vectors is a multi-dimensional vector that describes a concept from the corpus of sources; and inputting the first set of concept vectors into the third pattern-recognizer pathway in the first neural network.

5. The method of claim 1, wherein the obtaining a first set of sentiment scores comprises:

obtaining a second set of sentiment scores, wherein the second set of sentiment scores comprises the first set of sentiment scores, wherein each sentiment score in the second set of sentiment scores describes the sentiment associated with a token in a second set of tokens, and wherein the second set of tokens comprises the first set of tokens;

cross-referencing the first set of tokens and the second set of tokens; and selecting, based on the cross-referencing and from the second set of sentiment scores, the sentiment scores associated with tokens that are in the first set of tokens and second set of tokens, resulting in the first set of sentiment scores.

6. A computer program product, the computer program product comprising a computer readable storage medium having program instructions embodied therewith, the program instructions executable by a computer to cause the computer to:

obtain a first set of entity vectors, wherein each entity vector in the first set of entity vectors is a multi-dimensional entity vector that is associated with and describes an entity from a first set of entities from a corpus of sources, wherein the description is based in part on a relationship of the entity to at least a portion of the remainder of the corpus of sources, and wherein the corpus of sources contains at least one natural-language source;

obtain a first set of sentiment scores, wherein each sentiment score in the first set of sentiment scores describes a sentiment associated with a corresponding entity that is described by an entity vector in the first set of vectors;

obtain a second set of vectors, wherein each vector in the second set of vectors is a multi-dimensional vector that describes a token from a first set of tokens from the corpus of sources, wherein the description is based in part on a relationship of the token to at least a portion of the remainder of the corpus;

obtain a second set of sentiment scores, wherein each sentiment score in the second set of sentiment scores describes a sentiment associated with a corresponding token that is described by a vector in the second set of vectors;

input the first set of entity vectors and the first set of sentiment scores into a first pattern-recognizer pathway in a first neural network;

inputting the second set of vectors and the second set of second sentiment scores into a second pattern-recognizer pathway in a second neural network, wherein the first neural network and the second neural network are separate networks prior to generating the first probability value and the second probability value;

generate, by the first neural network and based on the first set of entity vectors and the first set of sentiment scores, a first probability value of a first potential future event; and generate, by the second neural network and based on the second set of vectors and the second set of sentiment scores, a second probability value of a second potential future event.

7. The computer program product of claim 6, wherein the program instructions further cause the computer to obtain a third set of sentiment scores, wherein the third set of sentiment scores comprises an average sentiment score of the corpus of sources.

8. The computer program product of claim 6, wherein the first set of entities is identified by a third neural network, the first set of entity vectors is created by a fourth neural network, the first set of sentiment scores is created by a fifth neural network, and the first, third, fourth, and fifth neural networks are components of a sixth neural network.

9. The computer program product of claim 6, wherein the program instructions further cause the computer to:
cross-reference the corpus of sources with a concept-mapper database;
identify, based on the cross-referencing, a first set of concepts;
vectorizing, by a third neural network, at least one concept from the first set of concepts, resulting in a first concept vector; and
input the first concept vector into a third pattern-recognizer pathway in the first neural network, wherein the generating the first probability value is also based on the first concept vector.

10. The computer program product of claim 6, wherein the program instructions further cause the computer to:
obtain, by a third neural network, a third probability value of a third potential future event;
input the first probability value into a multiple-regression function;
input the second probability value into the multiple-regression function;
input the third probability value into the multiple-regression function;
input at least one portion of structured data into the multiple-regression function; and
calculate an overall projected value based on the output of the multiple-regression function.

11. A system comprising:
a processor; and
a memory in communication with the processor, the memory containing program instructions that, when executed by the processor, are configured to cause the processor to perform a method, the method comprising:
analyzing, by a first neural network, a corpus of sources related to an identified subject matter, the corpus comprising at least one natural-language source;
creating, based on the analyzing the corpus by the first neural network, an entity model in the first neural network;
analyzing a second corpus of sources related to a potential future event, the second corpus comprising a second at least one natural-language source, the analyzing comprising:
identifying, by the entity model in the first neural network, a list of entities related to the potential future event;
identifying, by a concept mapper, a list of concepts related to the potential future event; and
determining, by a sentiment classifier and for each entity in the list of entities, a sentiment score;
inputting the list of entities, the list of concepts, and the second corpus into a second neural network;
creating, by the second neural network and for an entity in the list of entities, an entity vector, wherein the entity vector is a multi-dimensional vector that defines the entity based in part on a relationship of the entity to at least a portion of a remainder of the second corpus;
creating, by the second neural network and for a concept in the list of concepts, a concept vector, wherein the concept vector is a multi-dimensional vector that defines the concept based in part on a relationship of the concept to at least a portion of the remainder of the second corpus;
creating, by the second neural network and for a keyword in the second corpus, a keyword vector, wherein the keyword vector is a multi-dimensional vector that defines the keyword based in part on a relationship of the keyword to at least a portion of the remainder of the second corpus;
inputting the entity vector and the sentiment score for the entity into a first pattern-recognizer pathway in a third neural network;
inputting the concept vector into a second pattern-recognizer pathway in the third neural network;
inputting the keyword vector into a third pattern-recognizer pathway in the third neural network; and
generating, by the third neural network and based on the entity vector, the concept vector, the keyword vector, and the sentiment score, a probability value of the potential future event that is associated with the identified subject matter.

* * * * *